United States Patent
Yeo et al.

(10) Patent No.: US 7,227,589 B1
(45) Date of Patent: Jun. 5, 2007

(54) METHOD AND APPARATUS FOR VIDEO DECODING ON A MULTIPROCESSOR SYSTEM

(75) Inventors: Boon-Lock Yeo, Sunnyvale, CA (US); Valery Kuriakin, Nyzhny Nongorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,299

(22) Filed: Dec. 22, 1999

(51) Int. Cl.
*H04N 7/18* (2006.01)

(52) U.S. Cl. ............ 348/721; 375/240.25; 375/240.26

(58) Field of Classification Search ............... 375/240.1–240.28; 348/719–721
See application file for complete search history.

(56) References Cited

U.S. PATENT DOCUMENTS

| | | | |
|---|---|---|---|
| 5,212,742 A | | 5/1993 | Normile et al. |
| 5,428,403 A | * | 6/1995 | Andrew et al. ........ 375/240.16 |
| 5,467,131 A | * | 11/1995 | Bhaskaran et al. ......... 348/384 |
| 5,532,744 A | * | 7/1996 | Akiwumi-Assani et al. ..... 348/390.1 |
| 5,875,463 A | * | 2/1999 | Crump et al. ............... 711/123 |

FOREIGN PATENT DOCUMENTS

| EP | 0 720 372 A1 | 3/1996 |
|---|---|---|
| WO | WO 98/44745 | 10/1998 |

OTHER PUBLICATIONS

Yoshinori Takeuchi et al.: "RHINE: Reconfigurable Multiprocessor System for Video CODEC".
2334a IEICE Transactions on Fundamentals of Electronics, Communications and Computer.
Sciences, Institute of Electronics, vol. E76-A, No. 6, Jun. 1, 1993, pp. 947-955, XP000390392 ISSN: 0916-8508.

* cited by examiner

*Primary Examiner*—Andy Rao
(74) *Attorney, Agent, or Firm*—Blakely, Sokoloff, Taylor & Zafman LLP

(57) ABSTRACT

A method and apparatus for decoding compressed video. The method includes reading a stream of compressed video into a memory. The video includes multiple pictures, with each picture having one or more independent elements. Thereafter, assigning, via a first processor of a group of processors sharing the memory, at least one independent element per processor to be decoded by the processors in parallel; and decoding the independent elements of the video stream in parallel.

18 Claims, 5 Drawing Sheets

METHOD AND APPARATUS FOR VIDEO DECODING ON A MULTIPROCESSOR SYSTEM

FIELD OF THE INVENTION

The present invention relates computers and multimedia processing, and, in particular, to the decoding compressed video on a multiprocessor system.

BACKGROUND OF THE INVENTION

Recent advances in computer technology have placed video applications within the reach of more common applications. For example, high Definition Television, Broadcast satellite Service, Cable TV distribution on optical networks, Electron Cinema, Interactive Storage Media, Multimedia Mailing, Networked Data base Services, corporate Internet training and conferencing, Remote Video Surveillance and others are now becoming practical video applications.

The large amounts of data needed to make video available in all these cases has lead to the adoption of Moving Picture Experts Group 1 (MPEG) and MPEG-2 standards for motion video compression and decompression. These standards significantly reduce bandwidth and storage space requirements. As a result, MPEG-1 and MPEG-2 are used in many video applications and are continuing to become more popular.

However, one feature limiting widespread use of the MPEG standard is it computational complexity. Video encoding and decoding under MPEG is expensive, often too costly for single processors to achieve real-time performance in software for displays of acceptable resolution and size. The computational demands grow as users desire higher quality video.

Encoding is more expensive than decoding, but can typically be done offline and, therefore, may not need to be done in real-time. Decoding, however, typically requires real-time performance.

SUMMARY OF THE INVENTION

The present invention provides a method and apparatus for decoding compressed video. The method includes reading a stream of compressed video into a memory. The video includes multiple pictures, with each picture having one or more independent elements. Thereafter, assigning, via a first processor of a group of processors sharing the memory, at least one independent element per processor to be decoded by the processors in parallel; and decoding the independent elements of the video stream in parallel.

DETAILED DESCRIPTION

A method and apparatus for decoding compressed video on a multiprocessor system is disclosed. In the following description, for purposes of explanation, specific nomenclature is set forth to provide a thorough understanding of the present invention. However, it will be apparent to one skilled in the art that these specific details are not required in order to practice the present invention. For example, although the embodiments discussed below describe the present invention being used to decode video data encoded in accordance with the MPEG standard, alternative video encoding/decoding standards could be used without departing from the present invention.

MPEG Decoding

In its general form, an MPEG system stream is made up of two layers: the system layer contains timing and other information needed to demultiplex the audio and video streams and to synchronize audio and video during playback; and, the compression layer which includes the audio and video data streams.

Figure 1:
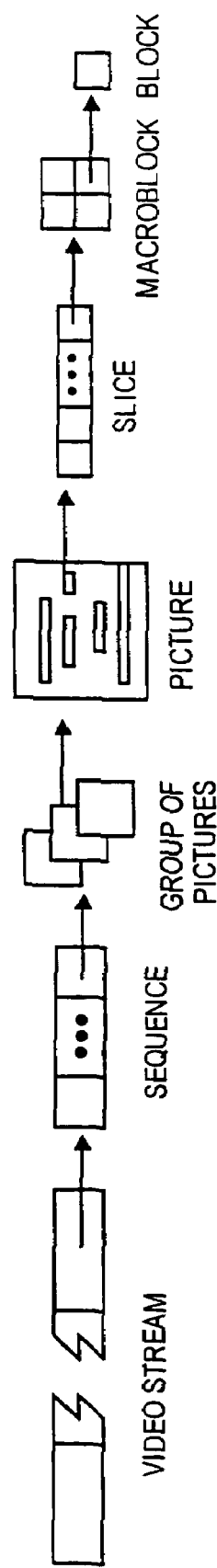
FIG. 1 illustrates the hierarchy of layers in an MPEG bitstream.

One embodiment of the hierarchy of layers in an MPEG bitstream is arranged in the following order, as illustrated in FIG. 1: Sequence, Group of Pictures (GOP), Picture Slice, Macroblock, and Block. The different parts of the stream are marked with unique, byte-aligned codes called startcodes. These startcodes are used both to identify certain parts of the stream and to allow random access into the video stream.

The highest level in the layering is the sequence level. A sequence is made up of groups of pictures (GOPs). Each GOP is a grouping of a number of adjacent pictures. One purpose in creating such an identifiable grouping is to provide a point of random access into the video stream for play control functions (fast forward, reverse, etc.).

Within each GOP are a number of pictures. In MPEG-2 interlaced video is supported so each picture corresponds to either a frame (for progressive or interlaced video streams) or a field (for interlaced video streams) in the original stream.

Pictures are further subdivided into slices, each of which defines a fragment of a row in the picture. Slices comprise a series of macroblocks, which in one embodiment are 16×16 pixel groups containing the luminance and chrominance data for those pixels in the decoded picture.

Macroblocks are divided into blocks. A block in one embodiment is an 8×8-pixel group that further describes the luminance or chrominance for that group of pixels. Blocks are the basic unit of data at which the decoder processes the encoded video stream. Macroblocks and blocks do not have startcodes associated with them; their boundaries are discovered implicitly while decoding.

Encoding

Figure 2:
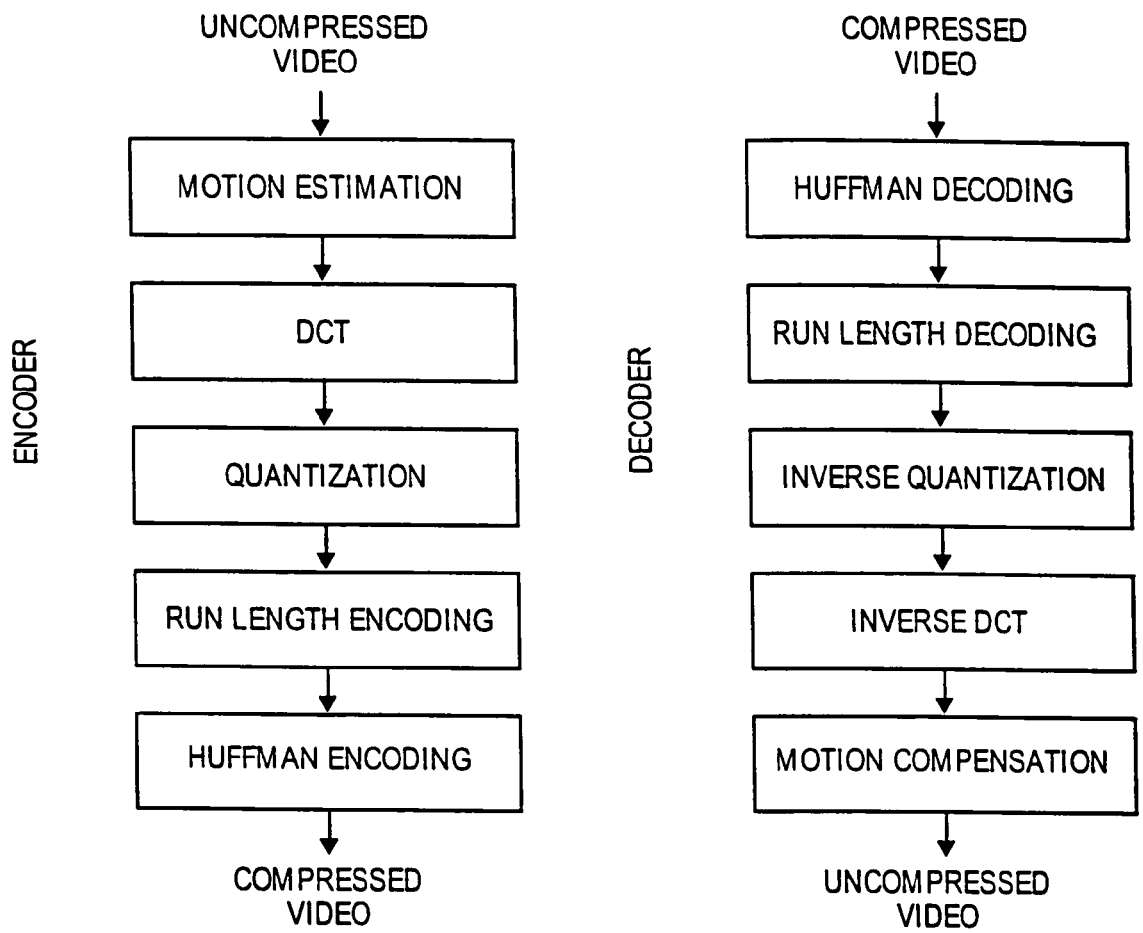
FIG. 2 illustrates a block diagram of encoding and decoding video data, according to one embodiment.

As described above, the block is the basic unit of data processing. As illustrated in FIG. 2, in one embodiment for each block of data in the video sequence, the encoder typically performs following five steps to produce an encoded block: motion estimation, discrete cosine transform (DCT), quantization, and run-length and Huffman coding.

In the first stage, motion estimation, the encoder tries to take advantage of temporal redundancies among pictures. The next four stages of the encoder take advantage of spatial correlation in compressing the video sequence. The result of performing these five encoding stages on all blocks in a video-sequence is an MPEG encoded video stream. A stream may be encoded once and then transmitted across a transmission media and/or stored as needed. However, decoding is typically necessary each time the stream is viewed.

Decoding

The decoding process for an MPEG encoded stream typically performs the five encoding stages in reverse order. First Huffman and run-length decoding are applied to generate the quantized block. Then inverse quantization is performed to obtain the block's frequency spectrum. From this, the inverse discrete cosine transform is taken. Then, if necessary, motion compensation may be used to generate the final macroblock of data from the prediction error, motion vectors, and reference picture.

A significant difference between the encoding and decoding processes is that in the former, much time is spent in motion estimation as it is necessary to search for the most similar macroblock in the reference picture(s), whereas in the latter, motion vectors are already available, which makes motion compensation much cheaper than motion estimation.

Decoding Video Data with Multiple Processors in Parallel

In order to increase the speed of decoding MPEG video data to provide the video data for more applications, one embodiment provides parallel decoding of the video data among multiple processors in a single system, sharing a memory. In particular, in one embodiment, the workload of decoding the video data is distributed among the set of processors at the slice level. In alternative embodiments, the workload of decoding the video data could be distributed among the set of processors at a level other than the slice level, without departing from the present invention.

Figure 3:
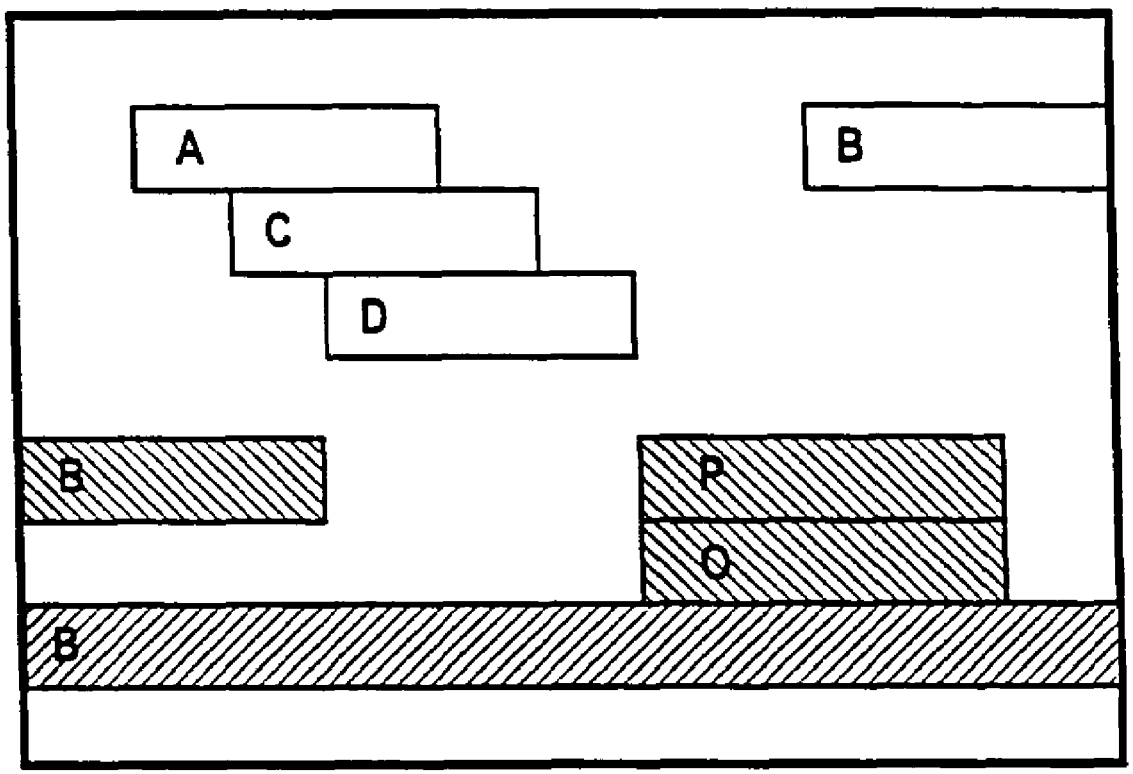
FIG. 3 illustrates a block diagram of a picture slice structure.

In particular, as defined by the standard, a slice in MPEG is a series of an arbitrary number of macroblocks within one row of the picture. FIG. 3 illustrates a general slice structure. Each slice contains at least one macroblock, and consecutive slices may not overlap. Slices occur in the bitstream in the order in which they are encountered, starting at the upper-left of the picture and proceeding by raster-scan order from left to right and top to bottom. However, slices do not need to maintain the same structure from picture to picture: there may be different numbers of slices and/or different slice sizes.

Figure 4:
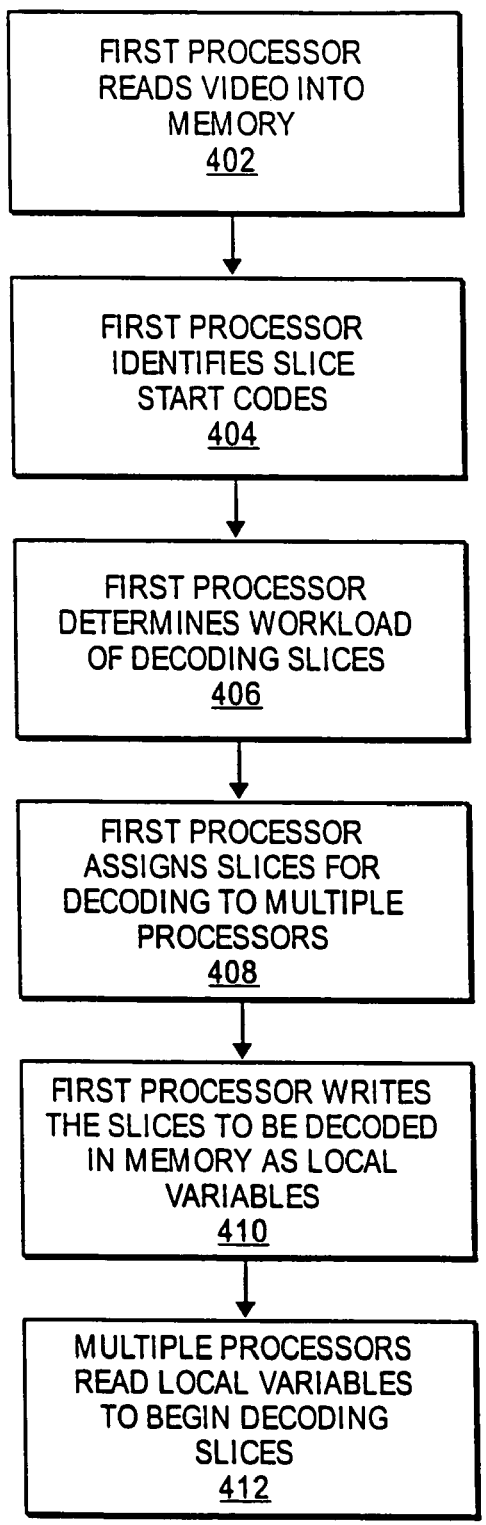
FIG. 4 illustrates a flow diagram describing the steps of decoding video data with multiple processors in parallel, according to one embodiment.

FIG. 4 is a flow diagram describing the steps of decoding the video data among multiple processors in parallel, according to one embodiment. In step 402 a first processor executing a first process, scans/reads a video sequence into memory from a disk or some other source of compressed video.

In step 404, the first processor further reads the video sequence to identify slice startcodes to identify the beginning of slices within the video sequence. In step 406, the first processor further reads the macroblocks within each slice to estimate the workload associated with decoding a respective slice.

In step 408, the first processor assigns one or more slices to be decoded, to each processor within a group of processors included in a system. In one embodiment, the slices are assigned to the different processors in a manner to spread the workload evenly among the processors. For example, if a first slice includes many macroblocks, it presumably will take longer to decode. Therefore, a second processor would be assigned fewer slices to decode because at least one slice presumably will take longer to decode. Subsequent adjacent slices may include significantly less macroblocks. Therefore, a third processor, may be assigned more slices to decode, with each slice containing less macroblocks. In the end, each of the processors, in one embodiment, is to receive a comparable workload of slices to decode.

In step 410, the first processor writes in a shared memory, the first and last assigned slices as local variables for each of the processors that are provided to decode the slices. For example, if the second processor is to decode slices 1-3, a third processor to decode slices 4-8, and a fourth processor decode slices 9-12, the slice numbers are written in memory as local variables for each of the respective processors. One benefit to assigning the slices by identifying the slices as local variables for the respective processors, as opposed to providing the slices in a jointly accessible task/slice queue, is the avoidance of conflicts between processors in accessing the queue to identify slices to be decoded.

For example, in the case of using a slice queue, once a processor is done decoding a slice it would return to the queue to determine the next slice to be decoded. In addition, the processor would also increment a pointer identifying the next slice to be decoded so that the next time a processor accesses the queue it will receive the subsequent slice to be decoded. Moreover, the queue would be accessed fairly frequent. As a result, conflicts between the processors accessing the queue would also be frequent. However, by assigning the slices to be decoded as local variables for each of the respective processors, conflicts between the processors in accessing the memory is significantly decreased.

In step 412, the respective processors read their respective local variables to determine which slices are to be decoded, and thereafter read the slices from memory and decode the slices in accordance with the decoding procedures discussed above. In one embodiment, the processor that assigns the slices to be decoded also assigns to it's self, one or more slices to be decoded, which the processor thereafter proceeds to decode along with the other processors. Moreover, in one embodiment, the respective processors perform the steps of decoding the slices by executing software routines stored in memory, provided for performing the decoding steps as discussed above (e.g., Huffman decoding, Run length decoding, etc.).

Thereafter, the first processor continues to scan/read in the video data and assign contiguous slices to the processors for decoding, for the desired quantity of video that is to be decoded. Furthermore, the method of decoding the video data by distributing the workload among multiple processors, as described above, can be performed in real-time.

Figure 5:
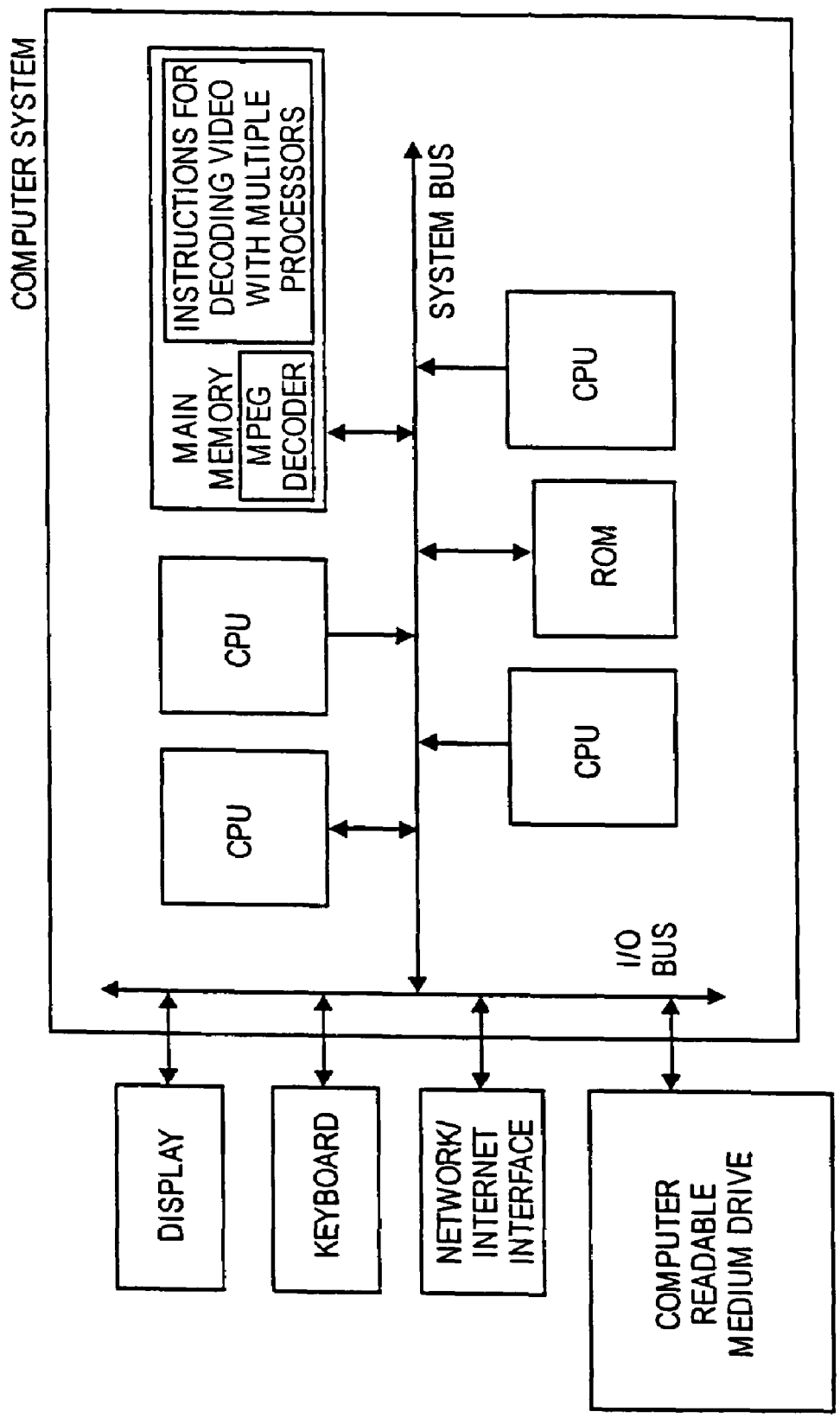
FIG. 5 illustrates a multiprocessor computer system having a computer readable medium with instructions stored thereon according to one embodiment.

FIG. 5 illustrates a system that is capable of decoding multiple slices in parallel with multiple processors, according to one embodiment. As illustrated, the system includes multiple processors sharing a memory (e.g., Symmetric Multiple Processor architecture). In an alternative embodiment, the multiple processors could access separate memories, rather than sharing the same memory, without departing from the present invention.

Moreover, as shown in the memory of the system in FIG. 5, the unit of logic to perform the method of decoding the video data through the use of multiple processors in parallel, as described above, could be provided a set of computer instructions to be executed by one or more of the processors. In addition, the logic to perform the steps of decoding the video data could also be provided/stored in memory as a set of computer instructions (e.g. MPEG decoder). The instructions to perform the methods as described above could alternatively be stored on other forms of computer/machine readable medium, including magnetic and optical disks. For example, method of the present invention can be stored on computer/machine readable mediums, such as magnetic disks or optical disks, that are accessible via a disk drive (or computer-readable medium drive), such as the disk drive shown in FIG. 5.

Alternatively, the logic to perform the methods as discussed above, including the method of decoding video data via multiple processors in parallel, could be implemented in additional computer and/or machine readable mediums, such as discrete hardware components such as large-scale integrated circuits (LSI's), application-specific integrated circuits (ASIC's), firmware such as electrically erasable programmable read-only memory (EEPROM's); and, electrical, optical, acoustical or other forms of propagated signals (e.g., carrier waves, infrared signals, digital signals, etc.).

What is claimed is:

1. A method for decoding compressed video comprising:
reading a stream of compressed video into a memory, said video having multiple pictures, each picture having one or more independent slices;
assigning, via a first processor of a group of symmetric multiple processors sharing said memory, at least one independent slice per processor, including assigning a varying number of slices to individual processors; and
each of the symmetric multiple processors, including the first processor, decoding the assigned slices in parallel without reading from a program memory other than the shared memory.

2. The method of claim 1, wherein assigning the independent slices includes assigning a comparable work load to the processors.

3. The method of claim 2, wherein assigning the independent slices includes placing in memory as a local variable, for each processor, the slices to be decoded by a respective processor.

4. The method of claim 3, wherein each slice includes at least one macroblock.

5. The method of claim 4, wherein said video is encoded in MPEG.

6. The method of claim 5, wherein the method of decoding is performed in real-time.

7. A computer-readable medium having stored thereon a set of instructions, said set of instruction for decoding compressed video, which when executed by a processor, cause said processor to perform a method comprising;
reading a stream of compressed video into memory, said video having multiple pictures, each picture having one or more independent slices;
assigning, via a first processor of a group of symmetric multiple processors sharing said memory, at least one independent slice per processor, including assigning a varying number of slices to individual processors; and
each of the symmetric multiple processors, including the first processor, decoding the assigned slices in parallel without reading from a program memory other than the shared memory.

8. The computer-readable medium of claim 7, wherein assigning the independent slices includes assigning a comparable work load to the processors.

9. The computer-readable medium of claim 8, wherein assigning the independent slices includes placing in memory as a local variable, for each processor, the slices to be decoded by a respective processor.

10. The computer-readable medium of claim 9, wherein each slice includes at least one macroblock.

11. The computer-readable medium of claim 10, wherein said video is encoded in MPEG standard.

12. The computer-readable medium of claim 11, wherein the method of decoding is performed in real-time.

13. A computer system comprising:
a plurality of symmetric multiple processors;
a memory coupled to said plurality of symmetric multiple processors;
a first unit of logic in a first processor of said group of symmetric multiple processors sharing said memory, said first unit of logic to read a stream of compressed video into said memory, said video having multiple pictures, with each picture having one or more independent slices;
said first unit of logic further assigns, at least one independent slice per processor, said first unit to assign a varying number of slices to individual processors; and
each of the symmetrical multiple processors, including the first processor, decodes the assigned slices in parallel without reading from a program memory other than the shared memory.

14. The computer system of claim 13, wherein said first unit of logic assigns a comparable work load to the processors.

15. The computer system of claim 14, wherein said first unit of logic places in memory as a local variable, for each processor, the slices to be decoded by a respective processor.

16. The computer system of claim 15, wherein each slice includes at least one macroblock.

17. The computer system of claim 16, wherein said video is encoded in MPEG standard.

18. The computer system of claim 17, wherein system computer system decodes said video in real-time.

* * * * *